United States Patent
Yoo

(10) Patent No.: US 9,042,076 B2
(45) Date of Patent: May 26, 2015

(54) IO PORT AND ELECTRONIC APPARATUS HAVING THE SAME

(71) Applicant: SAMSUNG Electronics Co., Ltd., Suwon-si, Gyeonggi-do (KR)

(72) Inventor: Min-hyung Yoo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 36 days.

(21) Appl. No.: 13/919,014

(22) Filed: Jun. 17, 2013

(65) Prior Publication Data

US 2014/0063678 A1   Mar. 6, 2014

(30) Foreign Application Priority Data

Aug. 31, 2012 (KR) .................. 10-2012-0096401

(51) Int. Cl.
*H05F 3/04* (2006.01)
*H01R 13/648* (2006.01)
*H02H 9/00* (2006.01)
*G06F 13/40* (2006.01)

(52) U.S. Cl.
CPC .............. *H05F 3/04* (2013.01); *H01R 13/6485* (2013.01); *H02H 9/004* (2013.01); *G06F 13/4081* (2013.01)

(58) Field of Classification Search
CPC ....... H05F 3/04; G06F 13/4081; H02H 9/004; H01R 13/6485

USPC ........................................................ 361/220
See application file for complete search history.

(56) References Cited

U.S. PATENT DOCUMENTS

| | | | | |
|---|---|---|---|---|
| 5,268,592 | A * | 12/1993 | Bellamy et al. ................. | 307/43 |
| 5,997,327 | A * | 12/1999 | Vergne et al. .................. | 439/181 |
| 6,310,410 | B1 * | 10/2001 | Lin et al. ........................ | 307/119 |
| 6,468,097 | B1 * | 10/2002 | Bernstein et al. .............. | 439/181 |
| 6,790,097 | B1 * | 9/2004 | Edwards et al. ............... | 439/676 |
| 7,556,517 | B2 * | 7/2009 | Smadi et al. ................... | 439/188 |
| 2002/0133660 | A1 | 9/2002 | Yamada et al. | |
| 2002/0138776 | A1 | 9/2002 | Cohen et al. | |
| 2008/0191551 | A1 | 8/2008 | Belanger et al. | |

FOREIGN PATENT DOCUMENTS

EP  0726527  8/1996

OTHER PUBLICATIONS

Extended European Search Report dated Jan. 8, 2014 issued in EP Application No. 13179777.1.

* cited by examiner

*Primary Examiner* — Scott Bauer
(74) *Attorney, Agent, or Firm* — Staas & Halsey LLP

(57) ABSTRACT

An IO port usable with an electronic apparatus to allow an external device to be connected thereto includes a plurality of signal pins disposed to exchange signals between the external device and the electronic apparatus, and at least one discharge pin disposed to be electrically connected to the external device ahead of the plurality of signal pins when the external device is connected to the IO port, and to discharge at least a portion of static electricity accumulated in the external device.

18 Claims, 19 Drawing Sheets

FIG. 8

| | Pin | Name | Description |
|---|---|---|---|
| IO Port | 1 | VCC | +5V |
| | 2 | D- | Discharge- |
| | 3 | S- | Signal- |
| | 4 | S+ | Signal+ |
| | 5 | D+ | Discharge+ |
| | 6 | GND | Ground |

FIG. 9

| | Pin | Name | Description |
|---|---|---|---|
| USB Memory | 1 | VCC | +5V |
| | 2 | D- | Data- |
| | 3 | D+ | Data+ |
| | 4 | GND | Ground |

IO PORT AND ELECTRONIC APPARATUS HAVING THE SAME

CROSS-REFERENCE TO RELATED APPLICATIONS

This application claims priority under 35 U.S.C. §119 from Korean Patent Application No. 10-2012-0096401, filed on Aug. 31, 2012, in the Korean Intellectual Property Office, the disclosure of which is incorporated herein by reference in its entirety.

BACKGROUND OF THE INVENTION

1. Field of the Invention

Methods and apparatuses consistent with exemplary embodiments relate to an input and output (IO) port and an electronic apparatus having the same, and more particularly, to an IO port which can protect an electronic apparatus from discharge of static electricity which occurs when an external device is inserted into the electronic apparatus, and an electronic apparatus having the same.

2. Description of the Related Art

In general, an electronic apparatus includes at least one IO port to allow an external device to be connected thereto.

When the external device is connected to the IO port of the electronic apparatus, discharge of static electricity may occur between the external device and the electronic apparatus due to an electrostatic potential difference therebetween. A chipset of the electronic apparatus may be damaged due to the discharge of the static electricity.

As the chipset becomes faster, an operating voltage of the chipset gets lower. Therefore, there is an increasing demand for a method for preventing chipset damage resulting from the discharge of the static electricity.

As a known method for preventing the chipset damage, a zener diode is applied to a signal line which is disposed between the chipset and an IO pad.

However, this method may increase a manufacturing cost and also has difficulty in maintaining a stable signal quality in view of signal integrity due to such an additional diode. This disadvantage observed in view of the signal integrity may become worse as the electronic apparatus becomes faster.

SUMMARY OF THE INVENTION

One or more exemplary embodiments provide an IO port which can prevent a chipset from being damaged by discharge of static electricity, while minimizing an increase in a manufacturing cost and maintaining a stable signal quality, and an electronic apparatus having the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an IO port usable with an electronic apparatus, which allows an external device to be connected thereto, the IO port including a plurality of signal pins to exchange signals between the external device and the electronic apparatus, and at least one discharge pin to be electrically connected to the external device ahead of the plurality of signal pins when the external device is connected to the IO port, and to discharge at least part of static electricity accumulated in the external device.

The discharge pin may be electrically connected to a filter to damp discharge of the static electricity accumulated in the external device.

The IO port may include a same number of discharge pins as the plurality of signal pins.

Each of the discharge pins may include a contact portion to be electrically connected to the external device, and the contact portion of the discharge pin may be disposed ahead of each of the signal pins of the IO port.

The discharge pin may further include a fixing portion which fixes the discharge pin, and an extension portion which extends between the fixing portion and the contact portion.

The extension portion may be disposed under a corresponding signal pin of the 10 port.

At least one region of the extension portion may be coated with a non-conductive sheath.

Each of the discharge pins may be fixed to an outer end of a corresponding signal pin of the IO port by means of a non-conductive fixing member.

The filter may be at least one of a resistance, a capacitor, a ferrite bead, a diode, and a varistor.

The discharge pin may be connected to an electrical ground of the electronic apparatus.

The IO port may include a same number of discharge pins as the plurality of signal pins, and one discharge pin may be disposed ahead of each signal pin.

Each of the discharge pins may be fixed to an outer end of a corresponding signal pin of the IO port by means of a non-conductive fixing member.

Each of the signal pins may include a contact portion to be electrically connected to the external device, and the discharge pin may be disposed lower than a contact portion of a corresponding signal pin of the IO port.

The IO port may further include an extension member which extends from the ground, and a connection member which connects the extension member and the discharge pin to each other.

The connection member may be of a spring type or a wire type.

The foregoing and/or other features and utilities of the present general inventive concept may also be achieved by providing an electronic apparatus including at least one 10 port to allow an external device to be connected thereto, and a controller to exchange signals with the external device through the IO port, and the IO port may include a plurality of signal pins to exchange signals between the external device and the controller, and at least one discharge pin to be electrically connected to the external device ahead of the plurality of signal pins when the external device is connected to the IO port, and to discharge at least part of static electricity accumulated in the external device.

The discharge pin may be electrically connected to a filter, which damps discharge of the static electricity accumulated in the external device.

The electronic apparatus may further include a printed circuit board (PCB) which connects the at least one IO port and the controller to each other, and the filter may be provided in the PCB.

The discharge pin may be connected to an electrical ground of the electronic apparatus.

The electronic apparatus may further include a PCB which connects the at least one IO port and the controller to each other, and the discharge pin may be connected to a ground which is disposed on the PCB.

According to the various exemplary embodiments described above, the user can easily recognize the contents displayed through the display screen having high transparency in the display apparatus.

The foregoing and/or other features and utilities of the present general inventive concept may also be achieved by providing an IO port usable with an electronic apparatus to be connectable to an external device, including a signal pin and a discharge pin having a contact portion disposed at a different position than a contact portion of the signal pin with respect to a reference plane of the IO port.

The contact portions of the discharge pin and the contact portion of the signal pin may be disposed in a line parallel to a direction in which the pins extend.

The IO port may further include a pin mounting member, the signal pin and the discharge pin may be extended from the pin mounting member, and the contact portion of the discharge pin may be spaced from the reference plane of the pin mounting member by a distance longer than that of the contact portion of the signal pin.

The discharge pin and the signal pin may be disposed to contact a pin of the external device at different times during a connecting operation of the external device into the IO port.

The discharge pin may be disposed to contact a pin of the external device at a first time during a connecting operation of the external device into the IO port, and the discharge pin and the signal pin may be disposed to simultaneously contact the pin of the external device at a second time during the connecting operation.

The contact portion of the discharge pin may contact a pin of the external device when the external device is at a first position with respect to the IO port during a connection operation, and the contact portion of the signal pin may contact the pin of the external device when the external device at a second position with respect to the IP port during the connection operation.

The foregoing and/or other features and utilities of the present general inventive concept may also be achieved by providing a method of forming an IO port usable with an electronic apparatus to be connectable to an external device, the method including forming a signal pin and a discharge pin in the IO port to have a contact portion disposed at a different position than a contact portion of the signal pin with respect to a reference plane of the IO port.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 8 is a table illustrating specifications of a plurality of pins included in the IO port of FIG. 5;

FIG. 9 is a table illustrating specifications of a plurality of pins included in the external device;

DETAILED DESCRIPTION OF THE PREFERRED EMBODIMENTS

Figure 1:
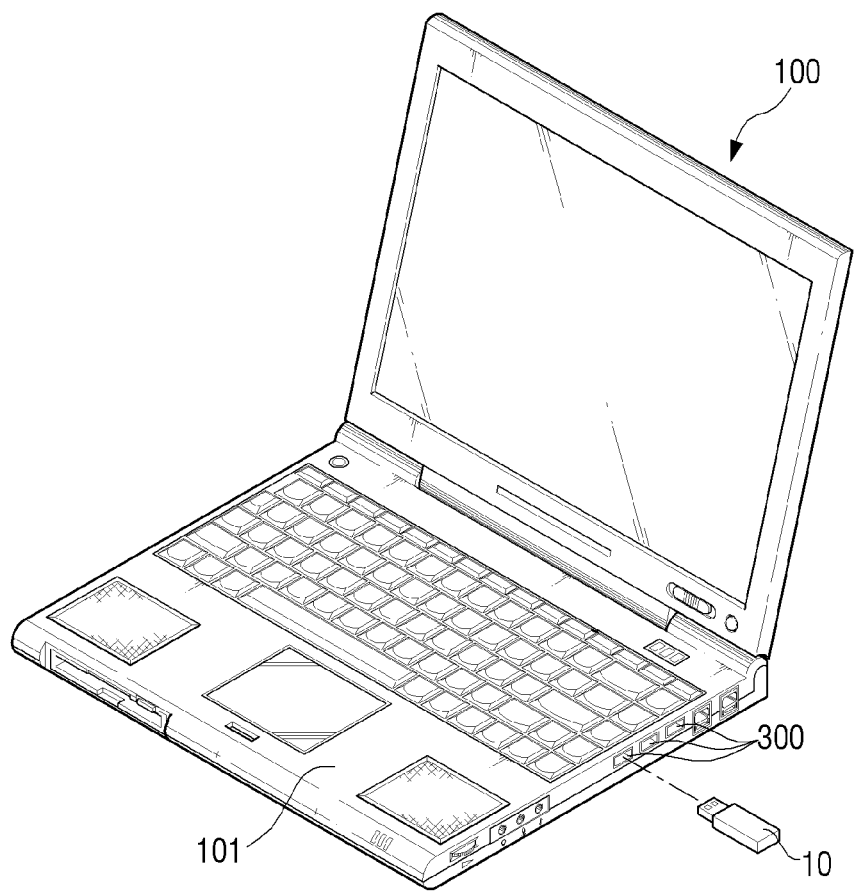
FIG. 1 is a perspective view illustrating an electronic apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
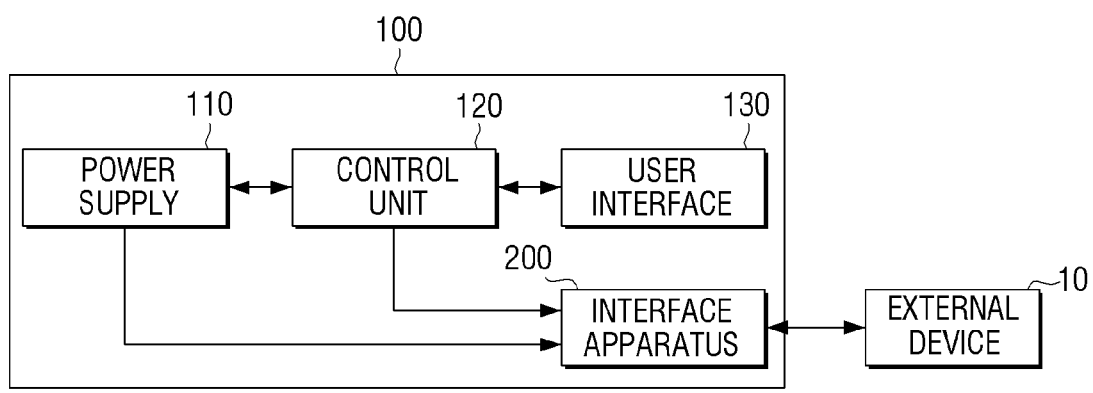
FIG. 2 is a block diagram illustrating the electronic apparatus of FIG. 1.
Figure 3:
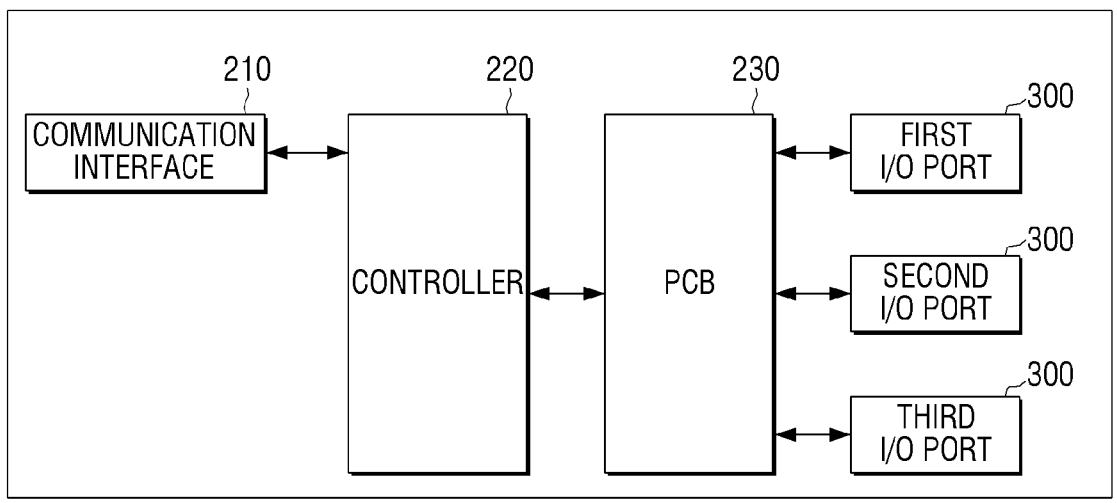
FIG. 3 is a block diagram illustrating an interface apparatus included in the electronic apparatus of FIG. 1.

FIG. 1 is a perspective view illustrating an electronic apparatus 100 according to an exemplary embodiment of the present general inventive concept, FIG. 2 is a block diagram illustrating the electronic apparatus 100 of FIG. 1, and FIG. 3 is a block diagram illustrating an interface apparatus 200 included in the electronic apparatus 100 of FIG. 1.

Referring to FIG. 1, the electronic apparatus 100 according to an exemplary embodiment may be a computer apparatus, for example, a notebook computer. Although the electronic apparatus 100 is explained as a notebook computer by way of an example, the present general inventive concept is not limited thereto. The electronic apparatus 100 may include a personal computer, a MP3 player, a portable multimedia player (PMP), and a mobile phone, which store and output various contents, as well as various broadcast receiving apparatuses such as a digital television (DTV), a DVD player, and a set-top box. The electronic apparatus 100 includes a body (housing) 101 formed with an input/output port 300 to be electrically connected to an external device 10.

Referring to FIG. 2, the electronic apparatus 100 includes a power supply 110, a control unit 120, a user interface 130, and an interface apparatus 200.

The power supply 110 supplies power to elements of the electronic apparatus 100. The power supply 100 may be implemented by a switched-mode power supply (SMPS) or may be implemented using a transformer or a rectifying circuit.

The power supply 110 may output different power according to an operational state of the electronic apparatus 100. For example, if the electronic apparatus 100 is in a general mode, the power supply 110 may output a general mode power to be supplied to all of the elements of the electronic apparatus 100. If the electronic apparatus 100 is in a standby mode, the power supply 110 may output a standby mode power to be supplied to a portion of the elements that are on standby.

The control unit 120 may be a mi-com (microprocessor or controller) and may control operations of the elements of the electronic apparatus 100. The control unit 120 controls operations of the power supply 110, the user interface 130, and the interface apparatus 200 of the electronic apparatus 100, and controls operations of the other elements in the electronic apparatus 100, which are not illustrated in FIG. 2.

The user interface 130 includes a plurality of function keys through which a user sets or selects various functions supported by the electronic apparatus 100, and may be implemented by an input and output, such as a touch screen or a panel usable as an input and output unit.

The user interface 130 may output contents of the electronic apparatus 100 or may output contents of an external device 10, which are transmitted through the interface apparatus 200.

The interface apparatus 200 is configured to connect the external device 10 to the electronic apparatus 100. The interface apparatus 200 may exchange various data signals and control signals with the external device 10 using universal serial bus (USB), micro USB, mobile high-definition link (MHL), and digital interface for video and audio (DiiVA) methods.

In the present exemplary embodiment, a USB memory is explained as an example of the external device 10 as illustrated in FIG. 1. However, this is merely an example and the external device 10 may include not only an auxiliary apparatus of the electronic apparatus 100 such as a mouse or a keyboard, but also a standalone electronic apparatus such as a printer or a scanner.

As illustrated in FIG. 3, the interface apparatus 200 includes a communication interface 210, a controller 220, a printed circuit board (PCB) 230, and an I/O port unit, for example, a plurality of IO ports 300.

The communication interface 210 is configured to be connected to the elements of the electronic apparatus 100, and exchanges data signals and control signals with the elements of the electronic apparatus 100 and receives power from the power supply 110.

The controller 220 controls the elements of the interface apparatus 200. The controller 220 controls operations of the communication interface 210, the PCB 230, and the plurality of 10 ports 300. The controller 220 may be called a "chipset."

The PCB 230 electrically connects the controller 220 and the IO ports 300. The controller 220 and the IO ports 300 may be mounted on the PCB 230.

The plurality of IO ports 300 allow the external device 10 to be connected thereto and are generally disposed on one side surface of the body 101 of the electronic apparatus 100 as illustrated in FIG. 1. Although three IO ports 300 are illustrated in FIG. 1, this is merely an example and the number of IO ports 300 provided on the electronic apparatus 100 may be 1, 3, or 4. That is, the number of IO ports 300 may be variously changed.

Figure 4:
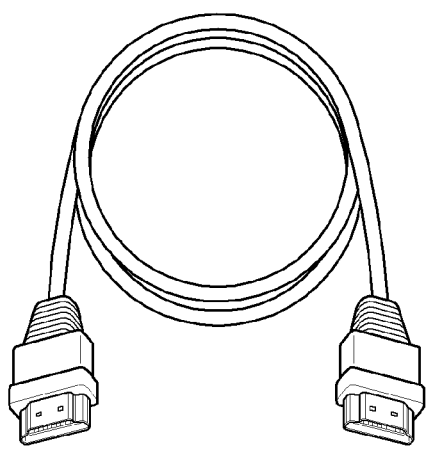
FIG. 4 is a perspective view illustrating a connection cable to connect an external device and the electronic apparatus of FIG. 1.

The external device 100 may be directly connected to the IO port 300 or may be connected to the IO port 300 through a connecting unit. For example, an external device such as a USB memory is directly connected to the IO port 300, and an external device such as a printer is connected to the IO port 300 through the connecting unit, such as a connection cable 20 as illustrated in FIG. 4.

Figure 5:
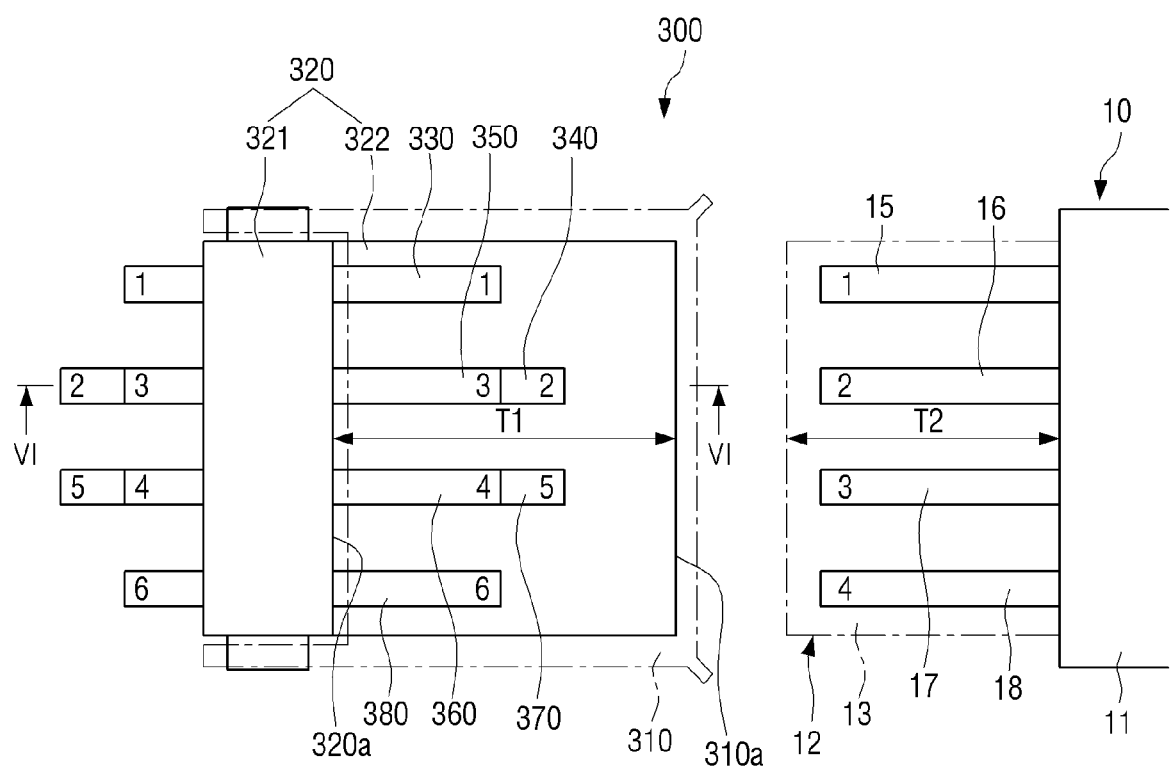
FIG. 5 is a schematic plane view illustrating an IO port included in the electronic apparatus of FIG. 1 to be connected to the external device according to an embodiment of the present general inventive concept.
Figure 6:
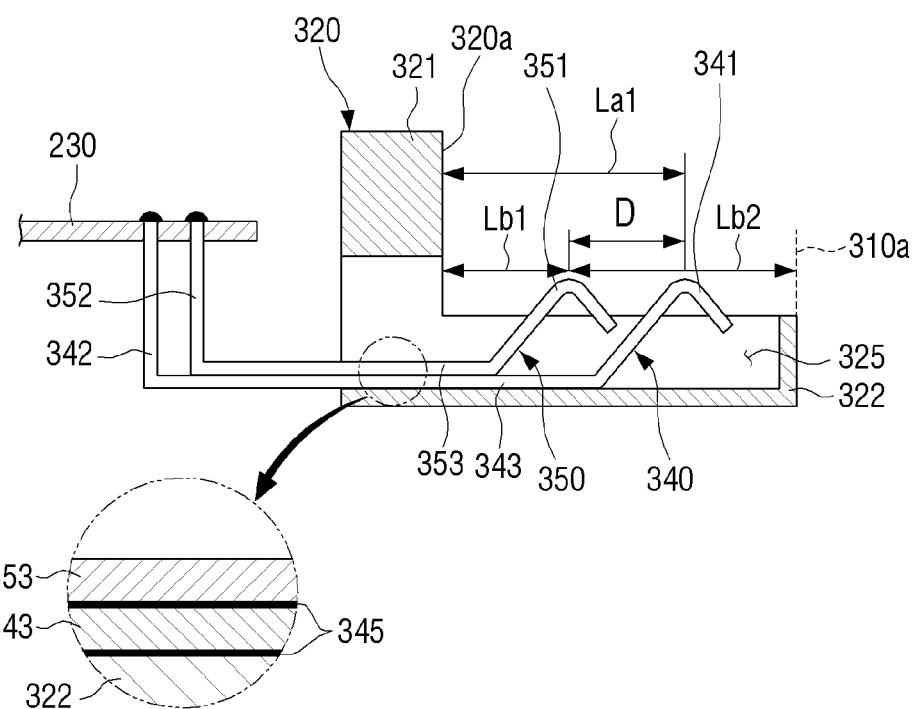
FIG. 6 is a schematic cross section view taken along line VI-VI of FIG. 5.

FIG. 5 is a schematic plan view illustrating the IO port 300 included in the electronic apparatus 100 of FIG. 1 to be connected to the external device 10 according to an embodiment of the present general inventive concept, and FIG. 6 is a schematic cross section view taken along line VI-VI of FIG. 5.

Referring to FIGS. 5 and 6, the IO port 300 includes an outer casing 310, a pin mounting member 320, and a plurality of pins 330, 340, 350, 360, 370, and 380.

The outer casing 310 is illustrated as dotted lines and is omitted in FIG. 6 for the convenience of explanation. The outer casing 310 accommodates the pin mounting member 320 therein and may be detachably connected with the pin mounting member 320. It is possible that the outer casing 310 can be fixedly coupled to the pin mounting member 320. The pin mounting member 320 may include one or more portions, for example, a vertical portion 321 and a horizontal section 322. The outer casing 310 may include an inlet or opening 310a to receive a terminal portion of the external device 10. The pin counting member 320 may have a surface 320a disposed to face the terminal portion of the external device 10 when the terminal portion of the external device 10 moves in an insertion direction such that the external device 10 is electrically connected to the IO port 300. The outer casing 310 may be made of metal material such as stainless steel. The outer casing 310 may be mounted on the above-described PCB 230 or may be coupled to the PCB 230 through the pin mounting member 320.

The plurality of pins, that is, first to sixth pins 330, 340, 350, 360, 370, and 380, are mounted in the pin mounting member 320. As illustrated in FIG. 6, the pin mounting member 320 includes the vertical portion 321 and the horizontal portion 322 which are perpendicular to each other, so that the pin mounting member 320 is formed in a substantially L-shape.

As illustrated in FIG. 6, the pin mounting member 320 may include one or more pin mounting recesses 325 to allow the plurality of pins 330, 340, 350, 360, 370, and 380 to be mounted therein. The pin mounting member 320 includes four pin mounting recesses 325, for example, a first one is for the first pin 330, a second one is for the second and third pins 340 and 350, a third one is for the fourth and fifth pins 360 and 370, and a fourth one is for the sixth pin 380. In FIG. 6, the pin mounting recess 325 for the second and third pins 340 and 350 is illustrated by way of an example, and the other pins 330, 360, 370, and 380 may have the substantially same shape.

The pin mounting member 320 is made of a non-conductive material. For example, the pin mounting member 320 may be made of non-conductive plastic.

The first pin 330 is a general voltage pin, the third and fourth pins 350 and 360 are general signal pins, the sixth pin 380 is a general ground pin, and the second and fifth pins 340 and 370 are discharge pins. In FIG. 8, specifications of such six pins 330, 340, 350, 360, 370, and 380 are explained in detail.

Referring to FIG. 5, the external device 10 may include a body 11 and a connection portion 12 as the terminal portion of the body 11 of the external device 10 to be inserted into the outer casing 310 of the IO port 300 through the inlet or opening 310a. The horizontal portion 322 may have a length T1, and the connection portion may have a length T2 in an inserting or detaching direction. The length T1 may be longer than the length T2. One or more pins, for example, four pins 15, 16, 17, and 18, are disposed on or over a non-conductive support plate 13 of the connection portion 12. The first pin 15 is a general voltage pin, the second and third pins 16 and 17 are general signal signals, and the fourth pin 18 is a general ground pin. In FIG. 9, specifications of such four pins 15, 16, 17, and 18 are explained in detail.

As illustrated in FIG. 6, the third pin 350, which is a signal pin, includes a contact portion 351, a fixing portion 352, and an extension portion 353. The contact portion 351 may have a contact point or surface to be brought into contact with the corresponding signal pin 16 of the external device 10, the fixing portion 352 is fixed to the PCB 230, and the extension portion 353 extends between the contact portion 351 and the fixing portion 352 and connects them to each other.

The fourth pin 360, which is the other signal pin, the first pin 330, which is a voltage pin, and the sixth pin 360, which is a ground pin, may have the same configuration as that of the third pin 350.

As illustrated in FIG. 6, the second pin 340, which is a discharge pin, has a similar configuration to that of the third pin 350. Accordingly, the second pin 340 includes a contact portion 341, a fixing portion 342, and an extension portion 343.

The contact portion 341 of the second pin 340 may have a contact point or surface to be brought into contact with the corresponding signal pin 16 of the external device 10, and may have the substantially same height as that of the contact portion 351 of the third pin 350 with respect to a reference surface of the horizontal portion 322. Also, as illustrated in FIG. 6, the contact portion 341 of the second pin 340 is disposed at a position spaced apart from the reference surface 320a of the pin mounting member 320 by a distance La1 and the contact portion 351 of the third pin 350 is disposed at a position spaced apart from the reference surface 320a of the pin mounting member 320 by a distance Lb1 and may be distanced from the contact portion 351 of the third pin 350 by a predetermined distance (D). Thus, the contact portion 341 of the second pin 340 and the contact portion 351 of the third pin 350 may be separated from each other without contacting each other. The contact portion 341 of the second pin 340 may be disposed from the opening 310a by a distance Lb1, and the contact portion 351 of the third pin 350 is disposed from the opening 310a by a distance Lb2 in the inserting direction.

Figure 7:
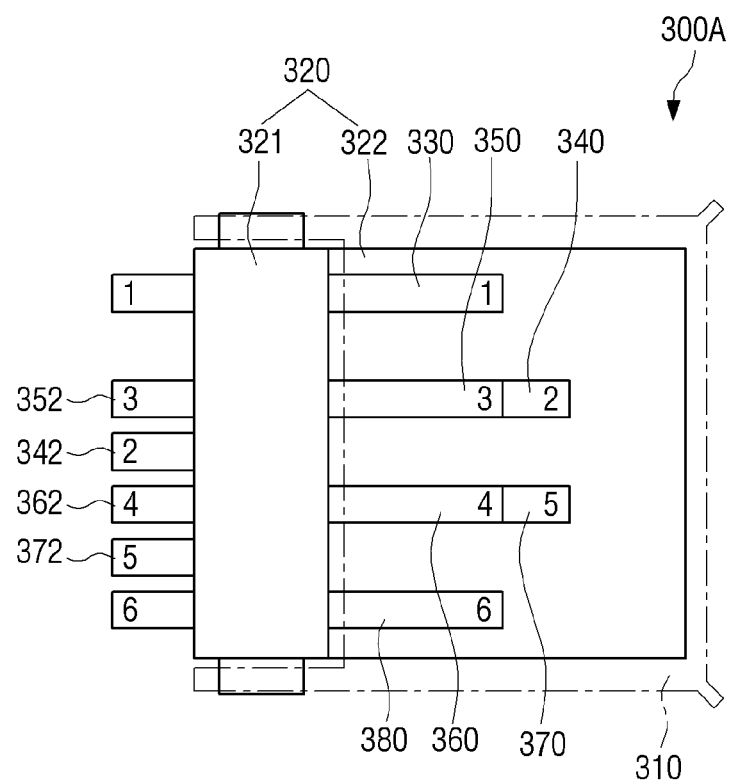
FIG. 7 is a cross section view illustrating an IO port included in the electronic apparatus of FIG. 1 to be connected to the external device according to an embodiment of the present general inventive concept.

The fixing portion 342 is exposed outside the pin mounting member 320 and is fixedly coupled to the PCB 230 by welding, for example. As illustrated in FIG. 6, the fixing portion 342 of the second pin 340 is disposed behind the fixing portion 352 of the third pin 350. That is, the fixing portion 342 of the second pin 340 may be disposed away from the pin mounting member 320 than the fixing portion 352 of the third pin 350. FIG. 7 is a plan view illustrating an IO port 300A included in the electronic apparatus 100 of FIG. 1 to be connected to the external device 10 according to an embodiment of the present general inventive concept. The IO port 300a of FIG. 7 is similar to the IO port 300 of FIG. 5 except that the fixing portion 342 of the second pin 340 may be disposed next to the fixing portion 352 of the third pin 350, and a fixing portion 372 of the fifth pin 370 may be disposed next to a fixing portion 362 of the fourth pin 360.

Referring to FIG. 6, the extension portion 343 of the second pin 340 extends longer than the extension portion 353 of the third pin 350, which are disposed above the extension portion 343 of the second pin 340. The extension portion 343 of the second pin 340 is coated with a sheath 345 which is made of non-conductive material. Electric connection between the second pin 340 and the third pin 350 can be prevented by means of the sheath 345. The sheath 345 may be substituted with a non-conductive sheath coated along the extension portion 353 of the third pin 350, or may be substituted with a separate non-conductive member which is disposed between the second pin 340 and the third pin 350.

The fifth pin 370, which is the other discharge pin, has the same configuration as that of the second pin 340, which is the discharge pin described above.

Figure 11A:
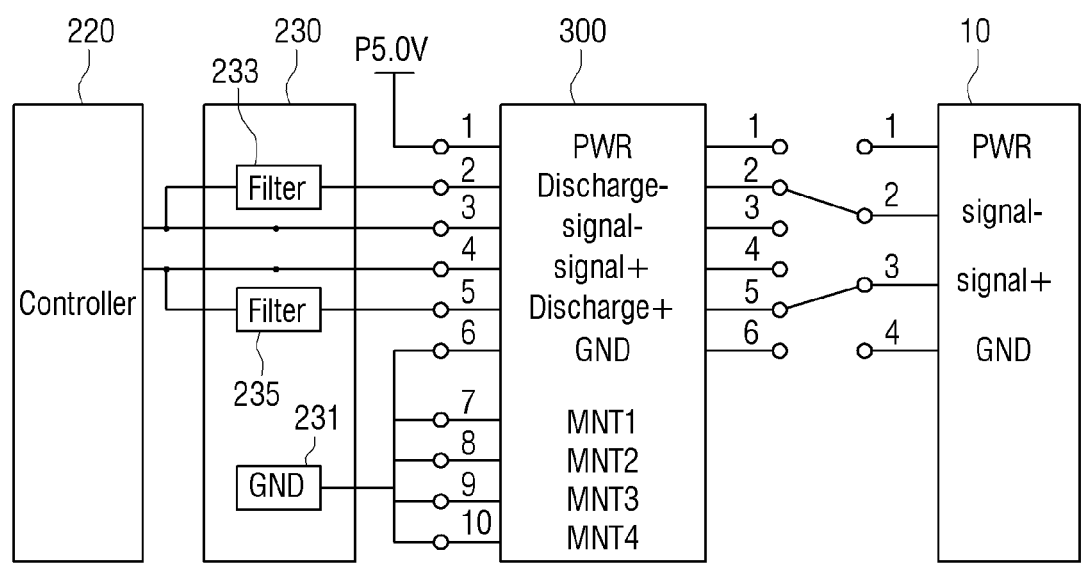
FIG. 11A is an electric circuit diagram in the interface apparatus when the signal pin of the external device contact the discharge pin of the IO port of FIG. 10A.

As illustrated in FIG. 11A, the above-described PCB 230 may include one or more filters, for example, first and second filters 233 and 235, and the second and fifth pins 340 and 370, which are discharge pins, are connected to the first and second filters 233 and 235 of the PCB 230, respectively. The external device 10 may have static electricity accumulated therein, and the static electricity may be discharged to the controller 220 or PCB 230 when being connected to the IO port 300. However, the filters 233 and 235 may damp the static electricity accumulated in the external device 10, thereby protecting the controller 220 or components of the PCB 230 from the discharge of the static electricity. Each of the filters 233 and 235 may be implemented by at least one of a resistance, a capacitor, a ferrite bead, a diode, and a varistor. A detailed configuration and an impedance value of the filter may be appropriately selected or used according to a characteristic of the controller 220 or characteristic of the electronic apparatus 100 or the external device 10.

Figure 10A:
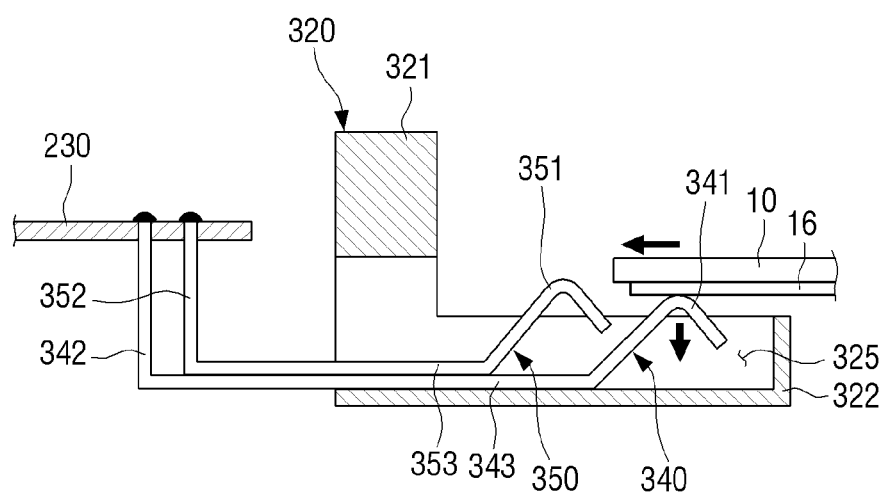
FIG. 10A is a cross section view illustrating a signal pin of an external device to contact a discharge pin (second pin) of an IO port prior to contact with a signal pin of the IO port according to an embodiment of the present general inventive concept.
Figure 10B:
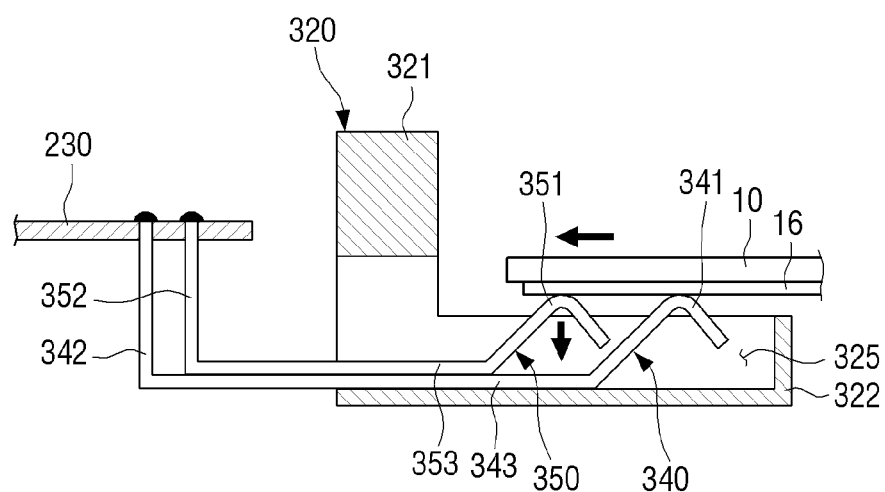
FIG. 10B is a cross section view illustrating a signal pin of an external device to contact a signal pin of an IO port according to an embodiment of the present general inventive concept.

FIG. 10A is a cross section view illustrating the signal pin 16 of the external device 10 which is brought into contact with the discharge pin (second pin) 340 of the IO port 300 prior to being brought into contact with the signal pin 350 of the IO port 300, and FIG. 10B is a cross section view illustrating the signal pin 16 of the external device 10 which is brought into contact with the signal pin 350 of the IO port 300. FIG. 11A, which corresponds to FIG. 10A, is an electric circuit diagram in the interface apparatus 200 when the signal pin 16 of the external device 10 is brought into contact with the discharge pin 340 of the IO port 300, and FIG. 11B, which corresponds to FIG. 10B, is an electric circuit diagram in the interface apparatus 200 when the signal pin 16 of the external device 10 is brought into contact with the signal pin 350 of the IO port 300.

Referring to FIGS. 5 and 10A, when the external device 10 is connected to the IO port 300, the two signal pins 16 and 17 of the external device 10 are brought into contact with the discharge pins (second and fifth pins 340 and 370) of the IO port 300, respectively. When the external device 10 is inserted toward the IO port 300 in an inserting direction, the contact portion 341 of the discharge pin 340 is slightly moved down by a pressure of the signal pin 16 of the external device 10 at a first portion of the external device 10 with respect to the IO port 300, as illustrated in FIG. 10A, and the contact portion 371 of the discharge pin 370 moves in the same way as the movement of the contact portion 341 of the discharge pin 340.

Referring to FIG. 11A corresponding to FIG. 10A, the second and fifth pins 340 and 370 of the IO port 300 are brought into contact with the signal pins 16 and 17 of the external device 100, and the other pins 330, 350, 360, and 380 of the IO port 300 are not electrically connected to the external device 10 at the first position.

When the second and fifth pins (discharge pins) 340 and 370 of the IO port 300 are connected to the first and second filters 233 and 235, respectively, a first amount of the static electricity accumulated in the external device 100 is discharged through the filters 233 and 25 before the external device 10 is completely inserted into the IO port 300 at a second position. That is, the first amount of the static electricity accumulated in the external device 10 is damped or discharged by the filters 233 and 235.

Referring to FIGS. 5 and 10B, the signal pins 16 and 17 of the external device 10 are brought into contact with the corresponding signal pins (third and fourth pins) 350 and 360 of the IO port 300, respectively, about a period of time, for example, about a millisecond, after the signal pins 16 and 17 of the external device 10 have started to be brought into contact with the discharge pins 340 and 370. The contact portion 351 of the signal pin 350 of the IO port 300 is slightly moved down by the pressure of the signal pin 16 of the external device 10 at the second position, and the contact portion 361 of the other signal pin 360 moves in the same way as the movement of the contact portion 351 of the signal pin 250. Also, at this time, the voltage pin 15 and the ground pin 18 of the external device 10 are brought into contact with the voltage pin (first pin) 330 and the ground pin (sixth pin) 380 of the IO port 300, respectively.

Figure 11B:
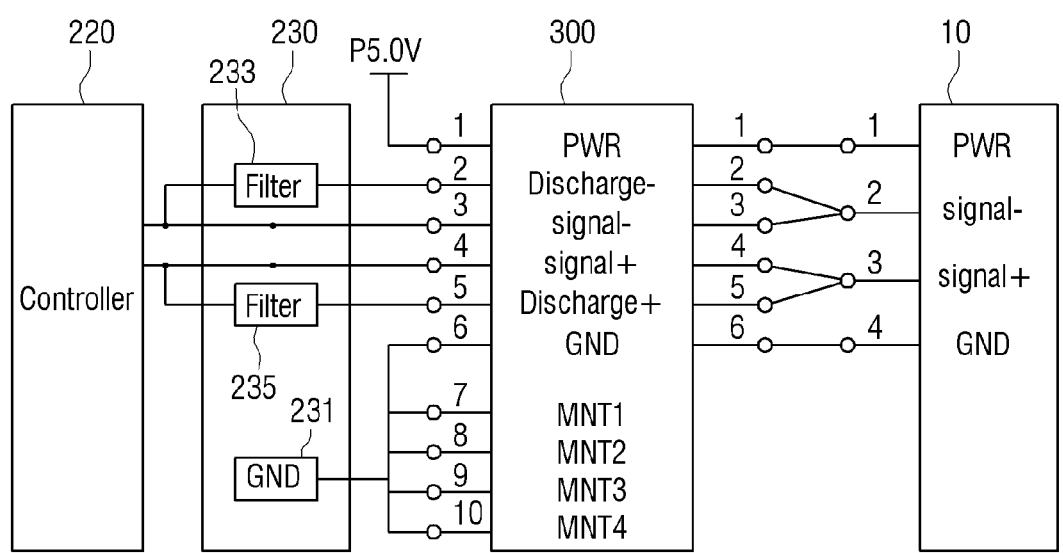
FIG. 11B is an electric circuit diagram in the interface apparatus when the signal pin of the external device is brought into contact with the signal pin of the IO port of FIG. 10B.

Referring to FIG. 11B corresponding to FIG. 10B, since the signal pins (second and third pins) 16 and 17 of the external device 10 are connected to the signal pins (third and fourth pins) 350 and 360 of the IO port 300, respectively, the controller 200 and the external device 10 may exchange data signals and control signals with each other. At this time, a second amount of the static electricity accumulated in the external device 10 may be discharged to the controller 220 through the signal pins 350 and 360 of the IO port 300.

However, since the first amount of the static electricity accumulated in the external device 10 has been already discharged by the discharge pins 340 and 370 and the filters 233 and 235 connected to the discharge pins 340 and 370, the controller 200 can be prevented from being damaged by the static electricity discharged from the external device 10. The first amount may be greater than the second amount. It is possible that the second amount may be close to zero according to the discharge state of the first amount of the static electricity accumulated in the external device 10.

The pins 330, 340, 350, 360, 370, and 380 of the IO port 300 may have a same width in a direction perpendicular to the inserting direction. However, the present general inventive concept is not limited thereto. It is possible that at least one of the pins 330, 340, 350, 360, 370, and 380 may have a different width from the other pins. For example, the discharge pins 340 and 370 may have a width wider than the width of the other pins. The pins 330, 340, 350, 360, 370, and 380 may have a same thickness in an up and down direction. However, the present general inventive concept is not limited thereto. It is possible that at least one of the pins 330, 340, 350, 360, 370, and 380 may have a different thickness from the other pins. For example, the discharge pins 340 and 370 may have a thickness thicker than that of the other pins to perform the discharge of the static electricity.

The pins 15, 16, 17, and 18 of the external device 10 may have a same width in a direction perpendicular to the inserting direction. However, the present general inventive concept is not limited thereto. It is possible that at least one of the pins 15, 16, 17, and 18 may have a different width from the other pins according to a design or user preference and a characteristic of the external device 10 or the electronic apparatus 100. The pins 330, 340, 350, 360, 370, and 380 may have a same thickness. However, the present general inventive concept is not limited thereto. It is possible that at least one of the pins 330, 340, 350, 360, 370, and 380 may have a different thickness from the other pins according to a design or user preference and a characteristic of the external device 10 or the electronic apparatus 100.

The pins 330, 340, 350, 360, 370, and 380 have the corresponding contact portion 331, 341, 351, 361, 371, and 381 to be disposed at different positions from a reference plane of the IO port 300. The contact portion of a first group of the pins 330, 340, 350, 360, 370, and 380 may be disposed at a distance from the reference plane different from the contact position of a second group of the pins 330, 340, 350, 360, 370, and 380. The pins 330, 340, 350, 360, 370, and 380 may have the contact portions to make contact with corresponding pins of the external device 10 at different times during an inserting operation of the external device 10 into the IO port 300 of the electronic apparatus 100.

The pins 16 and 17 of the external device 10 may have a protrusion formed on thereon at a position to contact the contact portion 341 and 371 of the discharge pins 340 and 370 when the pins 16 and 17 are in contact with the contact portion 351 and 361 of the signal pins 350 and 360 at the second position of the external device 10 with respect to the IO port 300. The protrusion may be a non-conductive material and disposed to disconnect the pins 16 and 17 from the pins 340 and 370, respectively, when the external device 10 is at the second position. When the first amount of static electricity is discharged and the second amount as a remaining amount of the static electricity is a minimum which may not affect the electronic apparatus 100 or the external device 10, the protrusion may be useable to provide disconnection between the pins 16 and 17 of the external device 10 and the corresponding discharge pins 340 and 370 according to a design or user preference or a characteristic of the external device 10 or the electronic apparatus 100.

Figure 12:
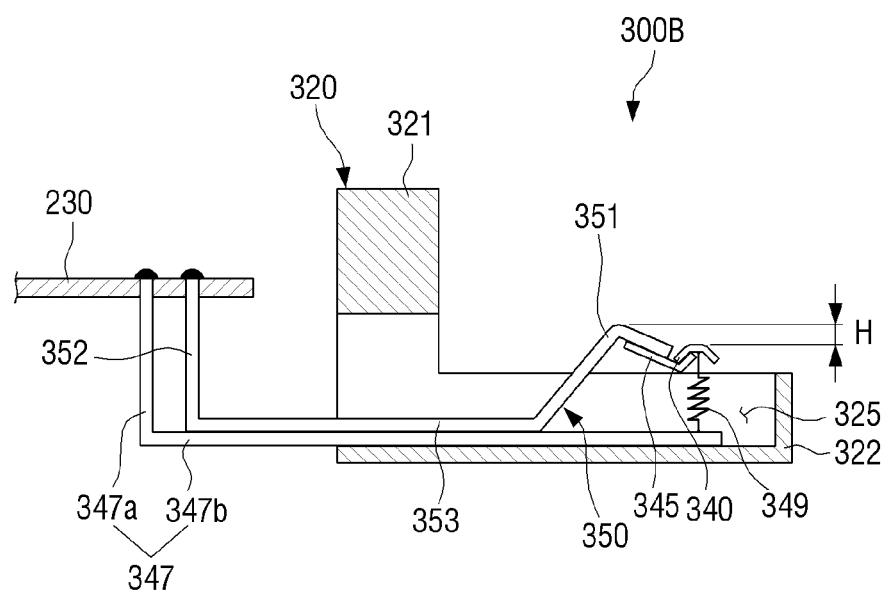
FIG. 12 is a schematic cross section view illustrating an IO port according to an embodiment of the present general inventive concept.

FIG. 12 is a view illustrating an IO port 300B according to an embodiment of the present general inventive concept.

Referring to FIG. 12, The IO port 300B according to this embodiment may be similar to the IO port 300 of FIG. 6. However, the IO port 300B may be different from those of the IO port 300 (see FIGS. 5 and 6) as described below.

The IO port 300B according to the present exemplary embodiment includes first to sixth pins 330, 340, 350, 360, 370, and 380 like the IO port 300 according to the above exemplary embodiment. The voltage pin 330, the signal pins 350 and 360, and the ground pin 380 are the same as those of the IO port 300 described above.

However, two discharge pins 340 and 370 are different from those of the above-described IO port 300 and will be described in detail below.

As illustrated in FIG. 12, a portion of the discharge pin 340 is fixed to a contact portion 351 of a corresponding signal pin 350 through a non-conductive fixing member 345. In other words, the discharge pin 340 is fixed to an outer end of the signal pin 350 through the non-conductive fixing member 345. At this time, the discharge pin 340 is disposed lower than the contact portion 351 of the signal pin 350 by a predetermined height (H) from a reference surface or plane of the horizontal portion 322.

Figure 15A:
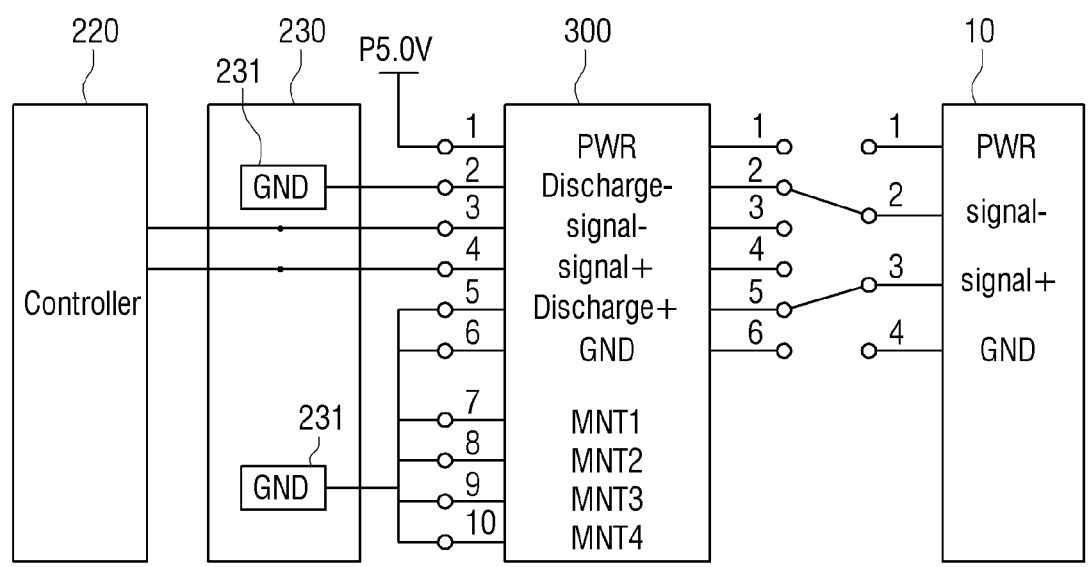
FIG. 15A is an electric circuit diagram in the interface apparatus when the signal pins of the external device are brought into contact with the discharge pins of the IO port of FIG. 14A according to an embodiment of the present general inventive concept.

The discharge pin 340 is electrically connected to a ground 231 on the PCB 230 (see FIG. 15A). Accordingly, the discharge pin 340 may be called a ground pin. To achieve this, the IO port 300B includes an extension member 347 which extends from the PCB 230 and a spring type connection member 349 which electrically connects the extension member 347 and the discharge pin 340 to each other.

The extension member 347 includes a fixing portion 347a which is fixed to the PCB 230 and an extension portion 347b which extends from the fixing portion 347a to the spring type connection member 349. As illustrated in FIG. 12, the extension portion 347b may have a portion to overlap one region of an extension portion 353 of the signal pin 350 which is disposed above the extension portion 347b. Accordingly, a non-conductive sheath may be coated around the extension portion 347b of the extension member 347 as an insulation layer to prevent unintentional electric connection between the extension member 347 and the signal pin 350.

Figure 13:
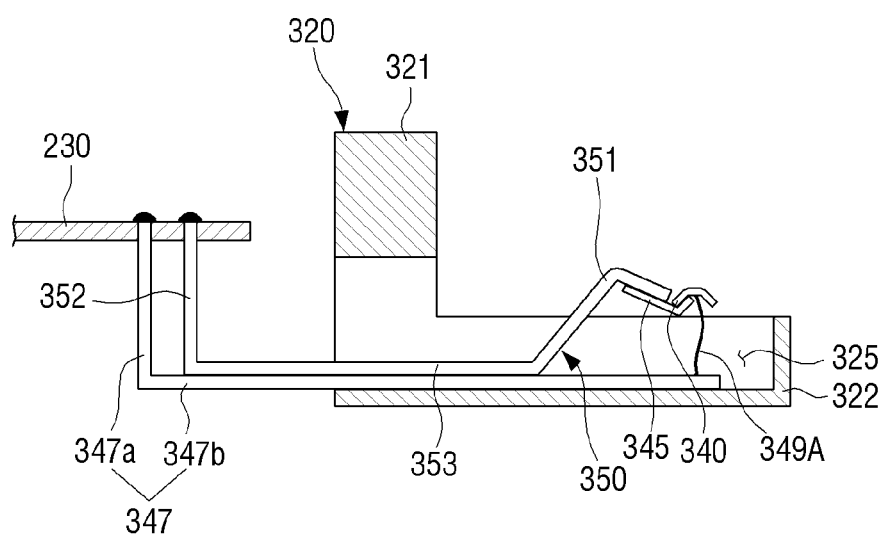
FIG. 13 is a schematic cross section view illustrating an IO port according to an embodiment of the present general inventive concept.

The spring type connection member 349 may be substituted with an elastic member, such as a wire type connection member 349A as illustrated in FIG. 13.

Figure 14A:
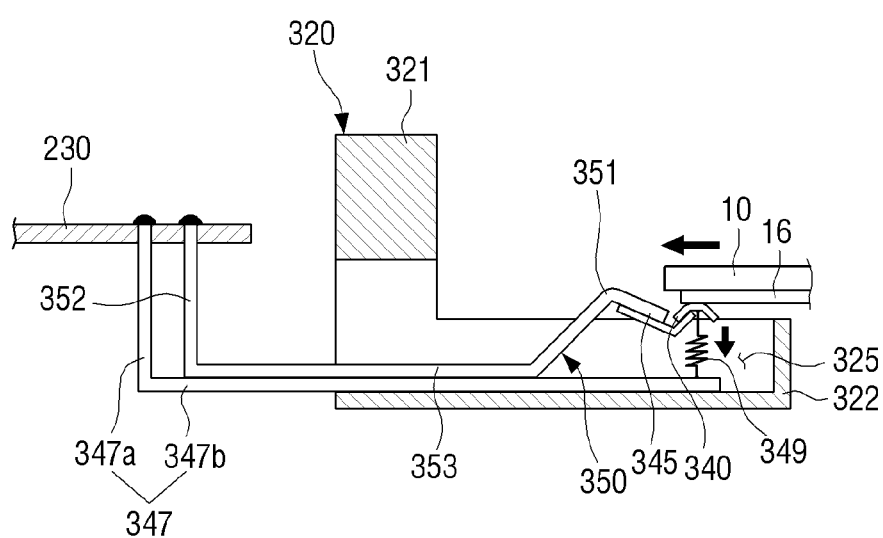
FIG. 14A is a cross section view illustrating signal pins of an external device to contact discharge pins (second pin) of the IO port prior to contact with signal pins of the IO port of FIG. 12 according to an embodiment of the present general inventive concept.
Figure 14B:
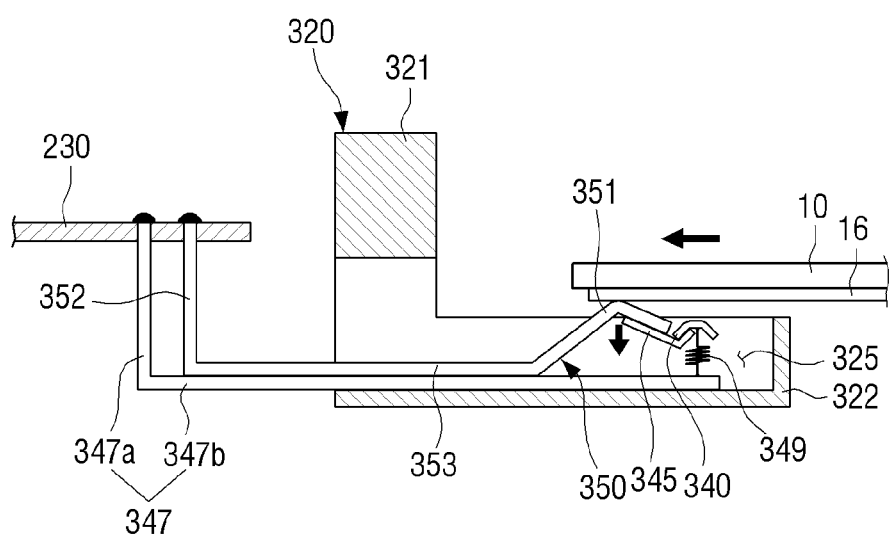
FIG. 14B is a cross section view illustrating the signal pins of the external device to contact with signal pins of the IO port of FIG. 12 according to an embodiment of the present general inventive concept.

FIG. 14A is a cross section view illustrating the signal pin 16 of the external device 10 which is brought into contact with the discharge pin (second pin) 340 of the IO port prior to being brought into contact with the signal pin 350 of the IO port 300, and FIG. 14B is a cross section view illustrating the signal pin 16 of the external device 10 which is brought into contact with the signal pin 350 of the IO port 300. FIG. 15A, which corresponds to FIG. 14A, is an electric circuit diagram in the interface apparatus 200 when the signal pin 16 of the external device 10 is brought into contact with the discharge pin 340 of the IO port 300, and FIG. 15B, which corresponds to FIG. 14B, is an electric circuit diagram in the interface apparatus 200 when the signal pin 16 of the external device 10 is brought into contact with the signal pin 350 of the IO port 300.

Referring to FIGS. 5, 12, and 14A, when the external device 10 is connected to the IO port 300B, the two signal pins 16 and 17 of the external device 10 are brought into contact with the discharge pins (second and fifth pins) 340 and 370 of the IO port 300B, respectively, first. At this time, the discharge pins 340 and 370 are slightly moved down by pressure of the signal pins 16 and 17 of the external device 10.

Referring to FIG. 15A, which corresponds to FIG. 14A, the second and fifth pins 340 and 370 of the IO port 300B are brought into contact with the signal pins 16 and 17 of the external device 10, and none of the other pins 330, 350, 360, and 380 of the IO port 300B is electrically connected to the external device 10.

At this time, since the second and fifth pins (discharge pins) 340 and 370 of the IO port 300B are connected to the ground 231 of the PCB 230, the static electricity accumulated in the external device 10 is completely discharged.

Referring to FIGS. 5, 12, and 14B, the signal pins 16 and 17 of the external device 10 are brought into contact with the corresponding signal pins (third and fourth pins) 350 and 360 of the IO port 300B after about a millisecond since the signal pins 16 and 17 of the external device 10 have started to be brought into contact with the discharge pins 340 and 370. The signal pins 350 and 360 (specifically, their contact portions) of the IO port 300B are slightly moved down due to the contact and simultaneously the discharge pins 340 and 370 are separated from the signal pins 16 and 17 of the external device 10.

Figure 15B:
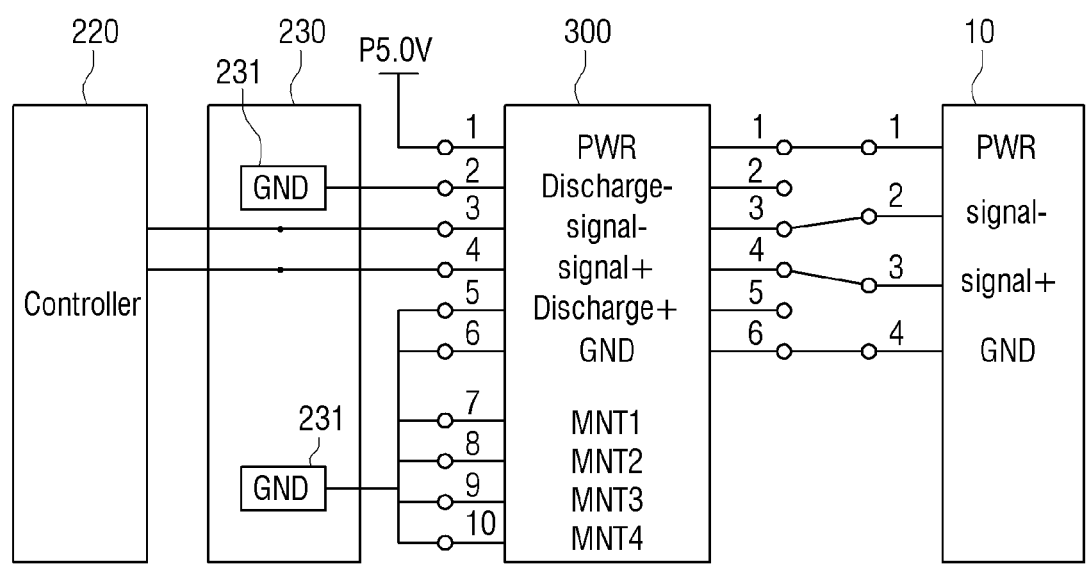
FIG. 15B is an electric circuit diagram in the interface apparatus when the signal pins of the external device are brought into contact with the signal pins of the IO port of FIG. 14B according to an embodiment of the present general inventive concept.

Referring to FIG. 15B corresponding to FIG. 14B, since the signal pins (second and third pins) 16 and 17 of the external device 10 are connected to the signal pins (third and fourth pins) 350 and 360 of the IO port 300B, the controller 200 and the external device 10 may exchange data signals and control signals with each other. At this time, since the static electricity accumulated in the external device 10 has been already discharged through the discharge pins 340 and 379, the controller 220 can be prevented from being damaged by an overcurrent occurring when the static electricity is discharged from the external device 10 to the controller 220. On the other hand, since the discharge pins 340 and 370 have been already separated from the signal pins 16 and 17 of the external device 10, the signals may not be lost by the discharge pins 340 and 370.

Although the discharge pins 340 and 370 of the IO port 300B are connected to the ground 231 in FIG. 12, the discharge pins 340 and 370 may be used to be connected to the filters 233 and 235, respectively, rather than the ground 231, as shown in FIG. 11A. In this case, it should be understood that the discharge pins 340 and 370 of the IO port 300B may serve as a means for damping discharge of the static electricity of the external device 10 like the discharge pins 340 and 370 of the IO port 300 shown in FIGS. 5 and 6.

According to an embodiment of the present general inventive concept, the above-described IO port usable with the electronic apparatus 100 to be connectable to the external device 10 may be formed according to the following method. The method may include forming a signal pin in the IO Port and forming a discharge pin in the OO port such that a contact portion of the discharge pin is disposed at a different position than a contact portion of the signal pin with respect to a reference plane of the IO port, for example, the inlet or opening 310a or mounting reference surface 320 of FIG. 5.

According to the exemplary embodiments described above, the discharge pins are disposed ahead of the signal pins of the IO port so that the static electricity in the external device connected to the IO port is discharged and thus the controller of the interface apparatus can be prevented from being damaged.

Also, when no zener diode is applied to a signal line, a manufacturing cost is not greatly increased and a stable signal quality can be maintained in view of signal integrity.

In the above-described exemplary embodiments, the discharge pins are disposed to correspond to the signal pins of the IO port one by one and this may be most preferable. However, alternatively, the object of the present inventive concept may be achieved by providing at least one discharge pin in the IO port to be electrically connected to the external device before the signal pins of the IO port are connected to the corresponding signal pins of the external device. At this time, it should be understood that the discharge pin is connected to a filter in the electronic apparatus to damp discharge of the static electricity or is connected to a ground of the electronic apparatus.

In the above-described exemplary embodiments, the IO port including only one pair of signal pins have been described. However, it should be understood that the present inventive concept is applied to an IO port that includes a plurality of pairs of signal pins without departing from the scope of the present inventive concept.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An IO port usable with an electronic apparatus, which allows an external device to be connected thereto, the IO port comprising:
a plurality of signal pins disposed to exchange signals between the external device and the electronic apparatus;
at least one discharge pin disposed to be electrically connected to the external device ahead of the plurality of signal pins when the external device is connected to the IO port, and disposed to discharge at least a portion of static electricity accumulated in the external device,
an extension member which extends from ground; and
a connection member which connects the extension member and the at least one discharge pin to each other,
wherein the connection member is of a spring type or a wire type.

2. The IO port as claimed in claim 1, wherein the discharge pin is electrically connected to a filter to damp discharge of the static electricity accumulated in the external device.

3. The IO port as claimed in claim 2, wherein the IO port comprises a same number of discharge pins as the plurality of signal pins.

4. The IO port as claimed in claim 3, wherein each of the discharge pins comprises a contact portion to be electrically connected to the external device, and the contact portion of the discharge pin is disposed ahead of each of the signal pins of the IO port.

5. The IO port as claimed in claim 4, wherein the discharge pin further comprises:
a fixing portion which fixes the discharge pin; and
an extension portion which extends between the fixing portion and the contact portion.

6. The IO port as claimed in claim 5, wherein the extension portion is disposed under a corresponding signal pin of the IO port.

7. The IO port as claimed in claim 6, wherein at least one region of the extension portion is coated with a non-conductive sheath.

8. The IO port as claimed in claim 4, wherein each of the discharge pins is fixed to an outer end of a corresponding signal pin of the IO port by means of a non-conductive fixing member.

9. The IO port as claimed in claim 2, wherein the filter is at least one of a resistance, a capacitor, a ferrite bead, a diode, and a varistor.

10. The IO port as claimed in claim 1, wherein the discharge pin is connected to an electrical ground of the electronic apparatus.

11. The IO port as claimed in claim 10, wherein the IO port comprises a same number of discharge pins as the plurality of signal pins, and one discharge pin is disposed ahead of each signal pin.

12. The IO port as claimed in claim 11, wherein each of the discharge pins is fixed to an outer end of a corresponding signal pin of the IO port by means of a non-conductive fixing member.

13. The IO port as claimed in claim 12, wherein each of the signal pins comprises a contact portion to be electrically connected to the external device, and the discharge pin is disposed lower than a contact portion of a corresponding signal pin of the IO port.

14. An electronic apparatus comprising:
at least one IO port which allows an external device to be connected thereto; and
a controller which exchanges signals with the external device through the IO port,
wherein the IO port comprises:
a plurality of signal pins disposed to exchange signals between the external device and the controller; and
at least one discharge pin disposed to be electrically connected to the external device ahead of the plurality of signal pins when the external device is connected to the IO port, and disposed to discharge at least a portion of static electricity accumulated in the external device,
an extension member which extends from ground; and
a connection member which connects the extension member and the at least one discharge pin to each other,
wherein the connection member is of a spring type or a wire type.

15. The electronic apparatus as claimed in claim 14, wherein the discharge pin is electrically connected to a filter, which damps discharge of the static electricity accumulated in the external device.

16. The electronic apparatus as claimed in claim 15, further comprising a printed circuit board (PCB) which connects the at least one IO port and the controller to each other,
wherein the filter is provided in the PCB.

17. The electronic apparatus as claimed in claim 14, wherein the ground is an electrical ground of the electronic apparatus.

18. The electronic apparatus as claimed in claim 17, further comprising:
a PCB which connects the at least one IO port and the controller to each other,
wherein the discharge pin is connected to a ground which is disposed on the PCB.

* * * * *